Nov. 28, 1933.                 K. A TRAENKLE                    1,936,923
                                ROLL FILM CASE
                            Filed June 24, 1933        2 Sheets-Sheet 1

Inventor:
Karl August Traenkle

Patented Nov. 28, 1933

1,936,923

UNITED STATES PATENT OFFICE 1,936,923

ROLL-FILM CASE

Karl August Traenkle, Jena, Germany, assignor to firm Carl Zeiss, Jena, Germany

Application June 24, 1933, Serial No. 677,370, and in Germany June 28, 1932

4 Claims. (Cl. 95—34)

The present invention relates to roll-film cases for photographic cameras equipped with a device producing a suction which makes the film portion to be exposed lie against a plate. In the known constructions of this kind, the plate is rigidly connected to the case and lies opposite a displaceable frame. Before the said suction takes place, the frame presses the film against the plate in such a manner as to close the space between film and plate in an air-tight manner. A device for rarifying the air in this space is disposed behind the plate, this device containing a displaceable member, for instance the rear frame of a bellows, which is moved away from the film when the said air-tight space is to be enlarged and a vacuum is to be created.

According to the invention, it is more advantageous to provide that the said plate may move, to press this plate against a fixed frame, and to so construct the suction device that the member to be moved so as to produce a vacuum is also displaced in the direction to the film. In this manner, the roll-film case is substantially simplified, and both the pressure plate and the suction member may be controlled by one single control member.

It is convenient to make the suction member displaceable in the pressure plate, and this in such a manner that it may not move before it has overcome a certain resistance in the plate, and to coordinate to the suction device a control member of the driving device. When a movement of the control member is transmitted to the suction member, the said resistance makes the suction member carry the plate along until this plate presses the film against the above-mentioned frame. Subsequently thereto, and not before, the suction member will move in the plate and produce in this manner a suction which holds the film against the plate. Obviously, the control member effects the control of both the pressure plate and the suction member.

The resistance the suction member is to overcome in the pressure plate may be effected for instance by friction. However, it is more convenient to place between the suction member and the pressure plate a suitable spring which is under tension also when the suction movement has not yet begun. It is advisable to use as a suction member an elastic diaphragm disposed in the suction plate and bent in such a manner as to have the requisite elasticity.

Figure 1:
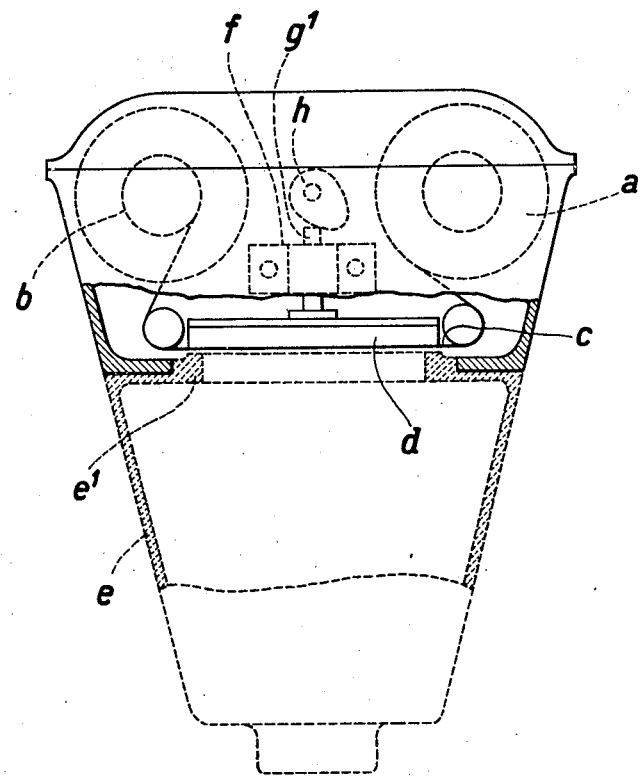
Figure 2:
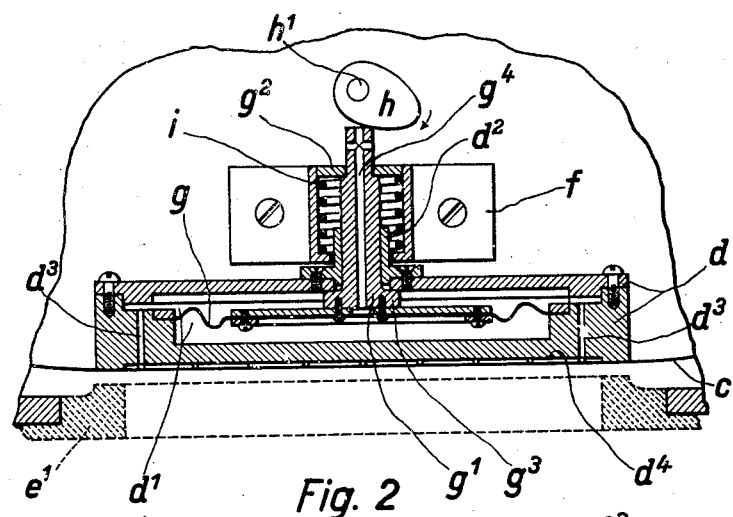
Figure 3:
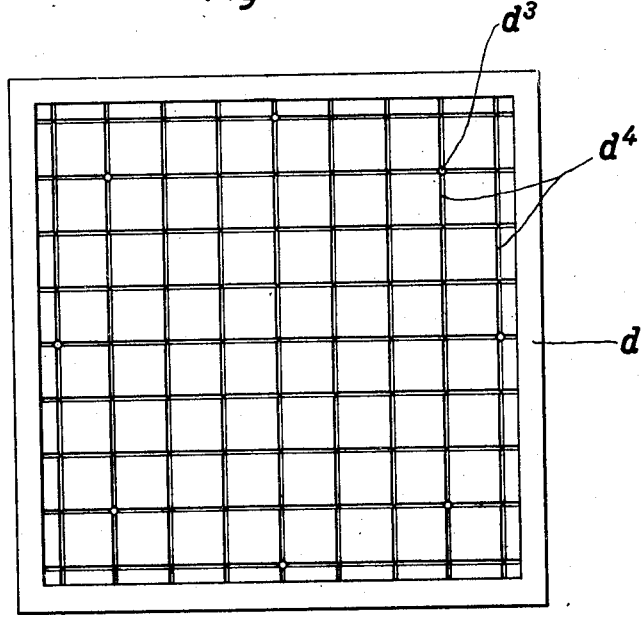

The accompanying drawings represent the constructional example of a roll-film case according to the invention. Figure 1 shows the case and the appertaining camera partly in view and partly in section. For the sake of clearness, only the important parts are represented. Figure 2 illustrates the suction device in section, and Figure 3 represents a single part in a view.

The roll-film case according to the drawings, which has a supply spool $a$ and a reel spool $b$ for a film $c$, contains a plate $d$ against which the film is to be held by suction. When the case is in use, the plate $d$ is opposite a frame $e^1$ fixed to the camera $e$. The film $c$ is moved between the plate $d$ and the frame $e^1$ and pressed tight by these two parts subsequently to each movement. To this effect, the plate $d$, which is designated pressure plate in the following description, is mounted in a body $f$ for displacement at right angles to the plane of the frame $e^1$, this body $f$ being rigidly connected to the case. The pressure plate $d$ has a hollow space $d^1$ in which is disposed a diaphragm $g$ acting as a movable suction member. At the centre of the diaphragm is fixed a rod $g^1$ which extends into a sleeve $d^2$ rigidly connected to the pressure plate $d$. Near its upper end, the rod $g^1$ has a disc $g^2$. The sleeve $d^2$ and the disc $g^2$ are displaceably mounted in the body $f$. Above the rod $g^1$ is disposed a control member, a cam disc $h$, which is fixed to an axle $h^1$ coupled to the driving device of the case. A cylindrical spiral spring $i$ is so disposed in the body $f$ that it permanently presses the disc $g^2$ upwardly and makes the rod $g^1$ continuously touch the cam disc $h$. The diaphragm $g$ is given such a tension that it presses the lower, and broader, part $g^3$ of the rod $g^1$ against the cover of the pressure plate $d$ in such a manner that the rod $g^1$ and the diaphragm $g$ may be displaced only against the resistance of the diaphragm spring in the pressure plate. The rod $g^1$ has a longitudinal bore $g^4$ which provides an outlet for the air in the closed space below the diaphragm $g$ when this diaphragm is moving downwardly. Bores $d^3$ in the pressure plate $d$ connect the space above the diaphragm $g$ with grooves $d^4$ in the lower side of the pressure plate $d$ (cf. Figures 2 and 3).

The apparatus described above works in the following manner. When the film has been wound so as to be ready for an exposure, the cam disc $h^1$ assumes the position indicated in the drawings. By manipulating the driving device, the disc $h^1$ is made to rotate in the sense of the arrow and presses the pin $g^1$ downwardly. On account of the tension of the diaphragm $g$, the pin $g^1$ carries the pressure plate $d$ along and presses the film $c$ against the frame $e^1$. As soon as this pressure is becoming stronger than the power of the tension of the diaphragm, this diaphragm moves downwardly in the pressure plate. As a consequence, the air in the space above the diaphragm is rarified, a vacuum arises between the film $c$ and the plate $d$, and the film is aspirated by the plate. In the space below the diaphragm $g$ the pressure is compensated by means of the bore $g^4$.

Obviously, the method of hermetically closing the plate against which the film is to be sucked and the manner in which this suction is effected are extremely simple.

I claim:

1. A roll-film case, comprising a housing, a frame disposed in the housing, a plate provided in the housing and displaceable at right angles to the plane of the said frame, a member disposed in the housing and displaceable in the same direction as the said plate, this member being adapted to rarify the air on that side of the plate which faces the said frame when moving towards this side, and means for moving the said plate and the said member at right angles to the plane of the said frame.

2. A roll-film case, comprising a housing, a frame disposed in the housing, a plate provided in the housing and displaceable at right angles to the plane of the said frame, a member disposed in the said plate and displaceable in the same direction as the said plate, this member being adapted to rarify the air on that side of the plate which faces the said frame when moving towards this side, means adapted to loosely interconnect the said plate and the said member, and other means for moving the said member at right angles to the plane of the said frame.

3. A roll-film case, comprising a housing, a frame disposed in the housing, a plate provided in the housing and displaceable at right angles to the plane of the said frame, a member disposed in the said plate and displaceable in the same direction as the said plate, this member being adapted to rarify the air on that side of the plate which faces the said frame when moving towards the side, a spring under tension, this spring being positioned between the said plate and the said member, and means for moving the said member at right angles to the plane of the said frame.

4. A roll-film case, comprising a housing, a frame disposed in the housing, a hollow plate provided in the housing and displaceable at right angles to the plane of the said frame, a diaphragm under tension fixed in the interior of the said plate, bores connecting the space above the diaphragm with that side of the plate which faces the said frame, and means for moving the diaphragm at right angles to the plane of the said frame.

KARL AUGUST TRAENKLE.